US012634885B2

(12) United States Patent　　　　(10) Patent No.:　US 12,634,885 B2
Fu　　　　　　　　　　　　　　　　(45) Date of Patent:　May 19, 2026

(54) PAGING EARLY INDICATION METHOD AND APPARATUS

(71) Applicant: Beijing Xiaomi Mobile Software Co., Ltd., Beijing (CN)

(72) Inventor: Ting Fu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 340 days.

(21) Appl. No.: 18/259,283

(22) PCT Filed: Dec. 26, 2020

(86) PCT No.: PCT/CN2020/139723
§ 371 (c)(1),
(2) Date: Jun. 26, 2023

(87) PCT Pub. No.: WO2022/134117
PCT Pub. Date: Jun. 30, 2022

(65) Prior Publication Data
US 2024/0064699 A1　　Feb. 22, 2024

(51) Int. Cl.
*H04W 68/02*　　　(2009.01)

(52) U.S. Cl.
CPC .................................. *H04W 68/02* (2013.01)

(58) Field of Classification Search
None
See application file for complete search history.

(56) References Cited

U.S. PATENT DOCUMENTS

2012/0122495 A1* 5/2012 Weng .................. H04W 68/025
　　　　　　　　　　　　　　　　　　　455/458
2018/0376444 A1* 12/2018 Kim ...................... H04W 76/30

FOREIGN PATENT DOCUMENTS

CN　　101577886 A　11/2009
CN　　104349282 A　2/2015
(Continued)

OTHER PUBLICATIONS

International Search Report of International Application No. PCT/CN2020/139723, dated Sep. 1, 2021, 4 pages.

(Continued)

*Primary Examiner* — Frantz Bataille

(74) *Attorney, Agent, or Firm* — Finnegan, Henderson, Farabow, Garrett & Dunner, L.L.P.

(57) ABSTRACT

The present disclosure relates to a paging early indication method and apparatus. The paging early indication method comprises: receiving a paging early indication (PEI) sent by a base station, wherein the PEI corresponds to one or more paging occasions (POs); and determining, on the basis of the PEI, a manner in which a downlink channel in the one or more POs is monitored. According to the present disclosure, information contained in the PEI is expanded, and compared with the related art in which the PEI only indicates whether a terminal needs to monitor paging DCI in the corresponding PO, the PEI in the embodiments may further indicate a manner in which the terminal monitors a downlink channel in the corresponding PO, expanding the indication function of the PEI, and increasing the utilization efficiency of the PEI, so that the terminal can achieve more functions according to the PEI, for example, synchronization may be performed according to the manner in which the downlink channel is monitored, or software and hardware preparations may be made in advance according to the manner in which the downlink channel is monitored.

20 Claims, 6 Drawing Sheets

```
                                                    ┌─ S101
┌─────────────────────────────────────────────────────┐
│                                                      │
│  Receive a paging early indication (PEI) sent by a base station  │
│                                                      │
└─────────────────────────────────────────────────────┘
                          │
                          ▼                  ┌─ S102
┌─────────────────────────────────────────────────────┐
│ Determine, on the basis of the PEI, a manner of monitoring a downlink │
│              channel in the one or more POs          │
└─────────────────────────────────────────────────────┘
```

(56) References Cited

FOREIGN PATENT DOCUMENTS

| | | | |
|---|---|---|---|
| CN | 108024331 | A | 5/2018 |
| CN | 109327889 | A | 2/2019 |
| CN | 110299978 | A | 10/2019 |
| CN | 110663284 | A | 1/2020 |
| CN | 111480366 | A | 7/2020 |
| CN | 112136349 | A | 12/2020 |
| KR | 20110004244 | A | 1/2011 |
| WO | WO 2018/201499 | A1 | 11/2018 |

OTHER PUBLICATIONS

Mediatek, Summary for Potential Power Saving Enhancements, 3GPP TSG RAN WG1 e-Meeting #102, R1-2007063, Aug. 17-28, 2020, 47 pages.
MediaTek Inc., Evaluation methodology and paging enhancements for idle/inactive mode UE power saving, 3GPP TSG RAN WG1 #102-e, R1-2005615, e-Meeting, Aug. 17-28, 2020, 11 pages.
Moderator (Media Tek), "Summary for Potential Power Saving Enhancements," 3GPP TSG RAN WG1 e-Meeting #102, R1-2007063, Aug. 17-28, 2020, 47 pages.
Moderator (Media Tek), "Summary for Potential Paging Enhancements," 3GPP TSG RAN WG1 e-Meeting #103, R1-2009753, e-Meeting, Oct. 26-Nov. 13, 2020, 88 pages.

* cited by examiner

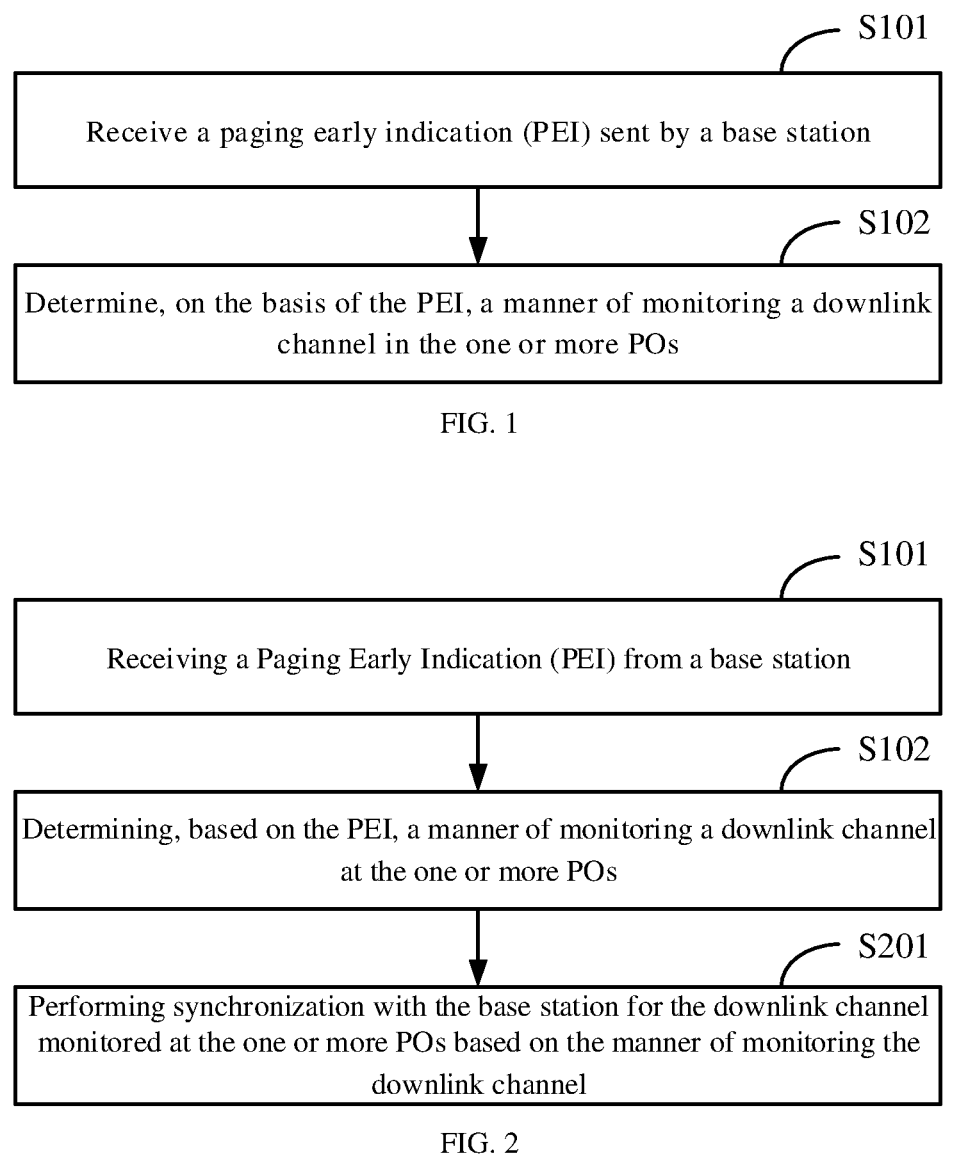

S101

Receive a paging early indication (PEI) sent by a base station

S102

Determine, on the basis of the PEI, a manner of monitoring a downlink channel in the one or more POs

Receiving a Paging Early Indication (PEI) from a base station

S102

Determining, based on the PEI, a manner of monitoring a downlink channel at the one or more POs

S201

Performing synchronization with the base station for the downlink channel monitored at the one or more POs based on the manner of monitoring the downlink channel

FIG. 2

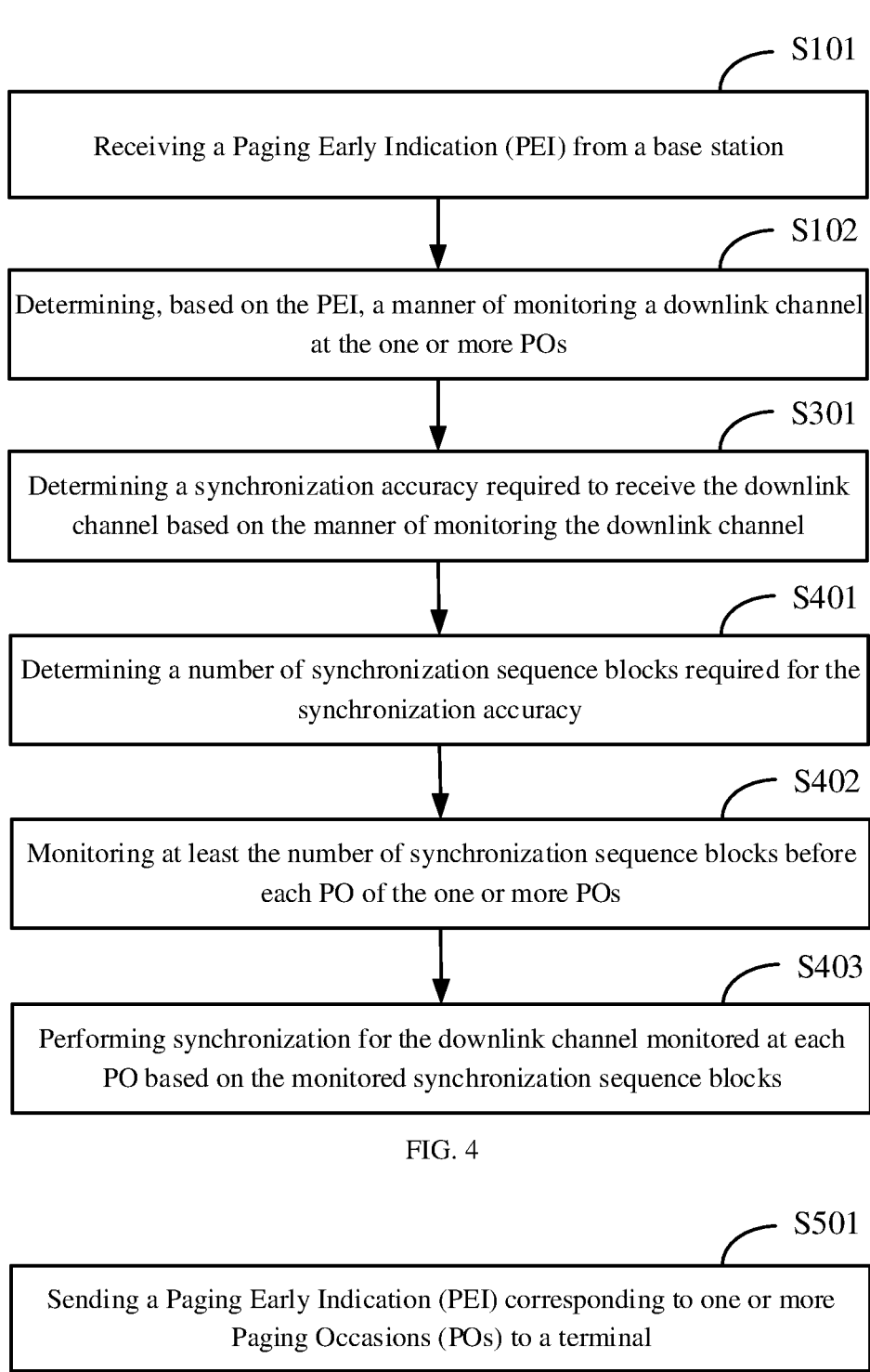

S101

Receiving a Paging Early Indication (PEI) from a base station

S102

Determining, based on the PEI, a manner of monitoring a downlink channel at the one or more POs

S301

Determining a synchronization accuracy required to receive the downlink channel based on the manner of monitoring the downlink channel

S401

Determining a number of synchronization sequence blocks required for the synchronization accuracy

S402

Monitoring at least the number of synchronization sequence blocks before each PO of the one or more POs

S403

Performing synchronization for the downlink channel monitored at each PO based on the monitored synchronization sequence blocks

Sending a Paging Early Indication (PEI) corresponding to one or more Paging Occasions (POs) to a terminal

FIG. 5

PAGING EARLY INDICATION METHOD AND APPARATUS

CROSS-REFERENCE TO RELATED APPLICATION

The present application is the U.S. National phase application of International Application No. PCT/CN2020/139723, filed on Dec. 26, 2020, the entire content of which is incorporated herein by reference.

TECHNICAL FIELD

The present disclosure relates to the field of communication technology, and in particular, to a paging early indication method and apparatus, electronic device, and computer readable storage medium.

BACKGROUND

When a terminal is in a non-connected state, the terminal can periodically monitor paging messages and enter a connected state after receiving the paging messages. The paging message can be carried in a Physical Downlink Share CHannel (PDSCH), which can be scheduled by a paging Downlink Control Information (DCI). The terminal can monitor the paging DCI at a Paging Occasion (PO) to determine whether the PDSCH containing the paging message is scheduled by the paging DCI, and then receive the PDSCH according to the resources specifically indicated by the paging DCI.

SUMMARY

According to a first aspect of the embodiments of the present disclosure, a paging early indication method is performed by a terminal, the method including:

receiving a Paging Early Indication (PEI) from a base station, wherein the PEI corresponds to one or more Paging Occasions (POs); and determining, based on the PEI, a manner of monitoring a downlink channel at the one or more POs.

According to a second aspect of the embodiments of the present disclosure, a paging early indication method is performed by a base station, the method including:

sending a Paging Early Indication (PEI) corresponding to one or more Paging Occasions (POs) to a terminal; wherein the PEI is configured to indicate to the terminal a manner of monitoring a downlink channel at the one or more POs.

According to a third aspect of the embodiments of the present disclosure, an electronic device includes:

a processor; and memory for storing instructions executable by the processor;

where the processor is configured to implement the method in the first aspect and/or the method in the second aspect as described above.

According to a fourth aspect of the embodiments of the present disclosure, there is provided a computer readable storage medium having a computer program stored thereon, which when executed by a processor implements the steps of the method in the first aspect and/or the method in the second aspect as described above.

BRIEF DESCRIPTION OF THE DRAWINGS

The accompanying drawings, which are to be used in the description of the embodiments, will be briefly described below. It is obvious that the accompanying drawings in the following description are only examples of the embodiments of the present disclosure, and for those of ordinary skill in the art, other embodiments can be obtained.

FIG. 1 is a schematic flowchart of a paging early indication method in accordance with embodiments of the present disclosure.

FIG. 2 is a schematic flowchart of another paging early indication method in accordance with embodiments of the present disclosure.

FIG. 4 is a schematic flowchart of yet another paging early indication method in accordance with embodiments of the present disclosure.

FIG. 5 is a schematic flowchart of yet another paging early indication in accordance with embodiments of the present disclosure.

DETAILED DESCRIPTION

Figure 3:
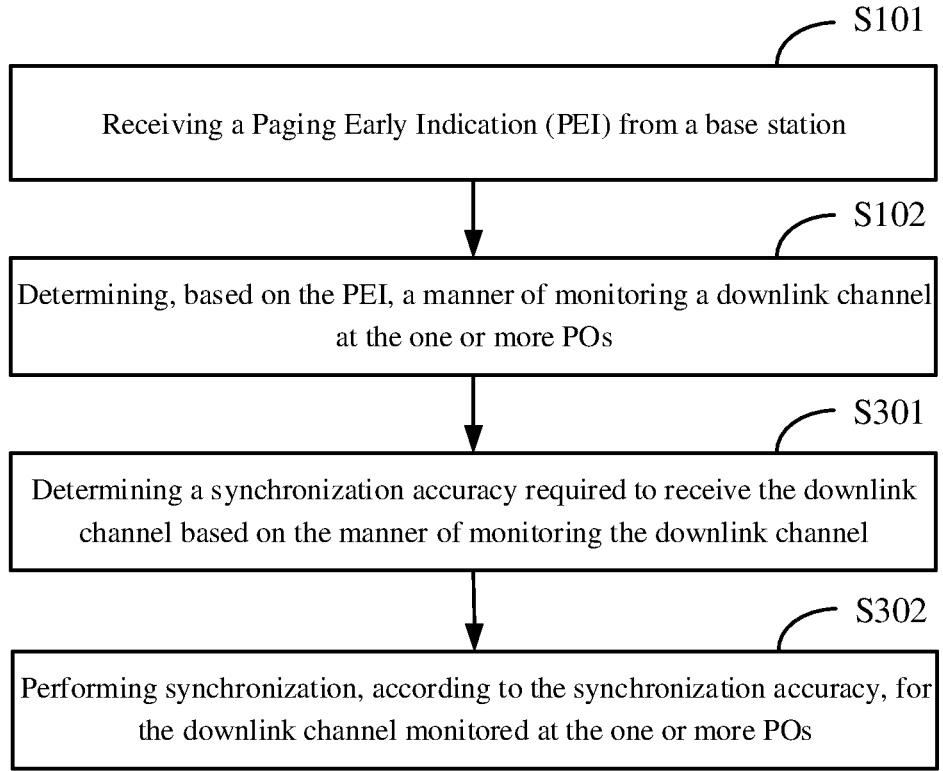
FIG. 3 is a schematic flowchart of yet another paging early indication method in accordance with embodiments of the present disclosure.

The technical solutions in the embodiments of the present disclosure will be clearly and completely described below in conjunction with the accompanying drawings in the embodiments of the present disclosure. It is apparent that the described embodiments are only examples of the embodiments of the present disclosure, and not all of them. Based on the embodiments in the present disclosure, other embodiments obtained by a person of ordinary skill in the art may fall within the scope of protection of the present disclosure.

In order to save power, the terminal can stay asleep in the non-connected state and periodically wake up before the PO to monitor the presence of a paging DCI at the PO. If the DCI is monitored at the PO and the PDSCH containing the page message is scheduled by the DCI, the terminal receives the PDSCH according to the specific instructions of the DCI. If the DCI is not monitored at the PO, or if the DCI is monitored, but the DCI does not schedule the PDSCH containing the page message, the terminal may not have to receive the PDSCH.

In order to achieve further power saving, in the related art, the base station can also send the terminal a PEI corresponding to the PO, through which the terminal can be indicated whether it needs to monitor the DCI at the PO corresponding to the PEI. For example, if the PEI indicates the terminal to perform monitoring at the corresponding PO, the terminal can wake up before the PO and perform monitoring at the PO; if the PEI indicates that the terminal does not need to perform monitoring at the corresponding PO, the terminal can stay asleep without waking up at the corresponding PO, and thus the unnecessary power consumption of the terminal can be reduced.

However, the PEI in the related art only indicates whether the terminal needs to perform monitoring at the PO, and the indication function of the PEI is relatively simple. In view of this, the embodiments of the present disclosure propose a paging early indication method, in which the PEI can indicate more information so as to expand the indication function of the PEI and enable the terminal to achieve more functions based on the PEI.

FIG. 1 is a schematic flowchart of a paging early indication method in accordance with embodiments of the present disclosure. The paging early indication method shown in this embodiment may be applicable to a terminal. The terminal includes, but is not limited to, a cell phone, a tablet, a wearable device, a sensor, an IoT device, and other electronic devices. The terminal can communicate with a base station as a user device. The base station includes, but is not limited to, a 4G base station, a 5G base station, a 6G base station. In an embodiment, the base station can be a base station to which the paging early indication method described in any of the following embodiments applies.

As shown in FIG. 1, the paging early indication method may include the following steps.

Step S101, receiving a Paging Early Indication (PEI) from a base station, wherein the PEI corresponds to one or more Paging Occasions (POs).

In an embodiment, before a Paging Occasion (PO), the base station sends a Paging Early Indication (PEI) corresponding to the PO to the terminal.

In an embodiment, a PEI may correspond to one PO, that is, a PEI can indicate whether a terminal needs to wake up to perform monitoring at a subsequent PO (after receiving the PEI). Alternatively, a PEI may also correspond to multiple POs, that is, a PEI can indicate whether a terminal needs to wake up to perform monitoring at subsequent multiple POs (after receiving the PEI), which requires the base station and the terminal to determine the correspondence between the PEI and POs in advance, and the specific correspondence between the PEI and POs is not limited in this embodiment. For example, a PEI can correspond to a recent PO following the PEI; or a PEI can correspond to a specified number of recent POs following the PEI; or the interval between the PEI and PO(s) can also be predefined, e.g., by a number of subframes in the time domain, etc.

In an embodiment, the terminal may receive a PEI sent by the base station and determine the one or more POs corresponding to the PEI.

Step S102, determining, based on the PEI, a manner of monitoring a downlink channel at the one or more POs.

In an embodiment, the manner of monitoring the downlink channel includes:

monitoring only a PDCCH; or monitoring the downlink channel including a PDSCH.

For the case of monitoring only the PDCCH, the PEI can indicate to the terminal that the downlink channel includes only the PDCCH. That is, the PEI can indicate to the terminal that the PDCCH needs to be monitored at the PO(s) corresponding to the PEI, i.e., the DCI in the PDCCH needs to be monitored. However, the DCI does not schedule the PDSCH containing the paging message, so that the terminal can determine, based on the PEI, that only the PDCCH needs to be monitored at the PO(s) and that the PDSCH does not need to be monitored.

For the case of monitoring the downlink channel including the PDSCH, the PEI can indicate to the terminal that the downlink channel includes the PDSCH. That is, the PEI can indicate to the terminal that the PDSCH needs to be monitored at the PO(s) corresponding to the PEI. Since the PDSCH is scheduled through the DCI and the DCI is carried through the PDCCH, the PEI can indicate to the terminal that the DCI in the PDCCH also needs to be monitored. Thus, the terminal can determine, based on the PEI, to monitor and receive the PDCCH at the PO(s), and also to monitor the PDSCH according to the specific instructions of the DCI.

It should be noted that if the PEI sent by the base station indicates that the downlink channel includes the PDSCH, the "downlink channel including the PDSCH" refers to at least two cases. In the first case, the PEI can indicate that the downlink channel includes both the PDCCH and the PDSCH. In the second case, the PEI can indicate that the downlink channel includes the PDSCH. In either case, the terminal can determine to monitor both the PDCCH and PDSCH at the PO(s).

Here, the embodiment shown in FIG. 1 is concluded. According to the embodiment shown in FIG. 1, the information contained in the PEI is expanded, and compared with the PEI in the related art which only indicates whether terminal needs to monitor the paging DCI at the corresponding PO, the PEI in this embodiment can also indicate the manner in which the terminal monitors the downlink channel at the corresponding PO, which expands the indication function of the PEI and improves the efficiency of using the PEI, so that the terminal can realize more functions, such as synchronization according to the manner of monitoring the downlink channel, or preparing the hardware and software in advance according to the manner of monitoring the downlink channel, etc.

In an embodiment, the terminal can perform synchronization according to the manner of monitoring the downlink channel, which is described below in conjunction with FIG. 2.

FIG. 2 is a schematic flowchart of another paging early indication method in accordance with embodiments of the present disclosure. As shown in FIG. 2, the method further includes:

Step S201, performing synchronization with the base station for the downlink channel monitored at the one or more POs based on the manner of monitoring the downlink channel.

In an embodiment, before the terminal receives the downlink channel at the PO(s), the terminal needs to wake up in advance for synchronization before the PO(s). In general, the terminal can wake up early to monitor a number of synchronization sequence blocks (SSBs) and then perform synchronization according to the synchronization sequence blocks.

In an embodiment, in addition to the above synchronization operations based on the manner of monitoring the downlink channel, the terminal can perform other operations.

In an embodiment, the synchronization performed by the terminal is different in the case of different manners of monitoring the downlink channel, which will be illustrated below in conjunction with FIG. 3.

FIG. 3 is a schematic flowchart of a paging early indication method in accordance with embodiments of the present disclosure. As shown in FIG. 3, the performing synchronization with the base station for the downlink channel monitored at the one or more POs based on the manner of monitoring the downlink channel, includes:

Step S301, determining a synchronization accuracy required to receive the downlink channel based on the manner of monitoring the downlink channel.

In an embodiment, the terminal requires different synchronization accuracies based on different manners of monitoring the downlink channel.

In an embodiment, in response to determining that the manner of monitoring the downlink channel is to monitor only the PDCCH, the synchronization accuracy is a first accuracy: in response to determining that the manner of monitoring the downlink channel is to monitor the downlink channel including the PDSCH, the synchronization accuracy is a second accuracy. The first accuracy is lower than the second accuracy.

For example, if the first accuracy required by the terminal to receive the PDCCH is 0.5 ppm, it can be determined that if the manner of monitoring the downlink channel is to monitor only the PDCCH, the synchronization accuracy is the first accuracy, i.e., 0.5 ppm. If the second accuracy required to receive the PDSCH is 0.1 ppm, it can be determined that if the manner of monitoring the downlink channel is to monitor the PDCCH and to monitor the PDSCH, the synchronization accuracy is the second accuracy, i.e., 0.1 ppm. It can be understood that the smaller the value of accuracy here, the higher the accuracy.

Step S302, performing synchronization, according to the synchronization accuracy, for the downlink channel monitored at the one or more POs.

In an embodiment, the terminal, after determining the synchronization accuracy, may perform corresponding synchronization operations according to the synchronization accuracy. For example, the terminal may monitor different numbers of synchronization sequence blocks according to different synchronization accuracies and perform synchronization according to the synchronization sequence blocks, which will described below in conjunction with FIG. 4.

FIG. 4 is a schematic flowchart of another paging early indication method in accordance with embodiments of the present disclosure. As shown in FIG. 4, the performing synchronization, according to the synchronization accuracy, for the downlink channel monitored at the one or more POs, includes:

Step S401, determining a number of synchronization sequence blocks required for the synchronization accuracy.

Step S402, monitoring at least the number of synchronization sequence blocks before each PO of the one or more POs.

Step S403, performing synchronization for the downlink channel monitored at each PO based on the monitored synchronization sequence blocks.

In an embodiment, the terminal may determine the number of synchronization sequence blocks (SSBs) that need to be received at least to reach the synchronization accuracy based on the synchronization accuracy required to receive the downlink channel. In general, the higher the required synchronization accuracy, the greater the number of SSBs required to reach the synchronization accuracy. For example, if the first accuracy required by the terminal for receiving the PDCCH is 0.5 ppm, the number of SSBs to be received is at least 1. If the second accuracy required for receiving the PDSCH is 0.1 ppm, the number of SSBs to be received is at least 3.

In an embodiment, the terminal, after determining the number of synchronization sequence blocks to be monitored, may wake up before the determined number of synchronization sequence blocks to monitor at least the number of synchronization sequence blocks.

For example, if the terminal determines, based on the PEI, that the manner of monitoring the downlink channel at the PO(s) is to monitor the PDCCH only, it can be determined that at least one SSB needs to be monitored to achieve the synchronization accuracy required for receiving the PDCCH. Thereby, the terminal can wake up before the at least 1 SSB that is prior to the PO(s), monitor the at least one SSB, and perform synchronization based on the monitored SSB(s).

If the terminal determines, based on the PEI, that the manner of monitoring the downlink channel at the PO(s) is to monitor the PDCCH and to monitor the PDSCH, it can be determined that at least 3 SSBs need to be monitored to achieve the synchronization accuracy required for receiving the PDSCH. Thereby, the terminal can wake up before the at least 3 SSBs that are prior to the PO(s), monitor the at least 3 SSBs, and perform synchronization based on the monitored SSBs.

According to the embodiment shown in FIG. 4, the terminal can determine, based on the PEI, the manner of monitoring the downlink channel and then determine the number of SSBs to be monitored. In contrast, in the related art, the PEI only indicates whether the terminal needs to perform monitoring at the PO(s), i.e., the terminal can only determine whether to perform monitoring at the PO(s), but cannot determine the manner of monitoring the downlink channel. Therefore, the terminal always needs to perform synchronization according to the highest accuracy. For example, if the terminal is not sure whether it needs to monitor the PDSCH or not, the terminal will perform synchronization according to the accuracy requirement of receiving the PDSCH and monitor the corresponding number of SSBs.

It should be noted that for the terminal, monitoring the SSB means that it needs to wake up from the sleep state in advance, and the more SSBs that need to be monitored, the longer it takes to wake up, and the greater the power consumption required by the terminal. Thus, according to the embodiment shown in FIG. 4, the terminal can determine the synchronization accuracy according to the actual manner of monitoring the downlink channel, so that the wake-up time can be reduced when the terminal does not need high accuracy synchronization, which can effectively save the power consumption of the terminal, compared with the method of always performing synchronization according to high accuracy in related art.

In an embodiment, there are various ways for the base station to send the PEI. For example, the base station may send the PEI at each PEI sending timing, or the base station may send the PEI only when the terminal needs to wake up, as explained separately below.

In a first way: the base station sends the PEI at each PEI sending timing. That is, the base station may send the PEI corresponding to each PO, regardless of whether the terminal needs to wake up at that PO to monitor the downlink channel.

The terminal determines, based on the PEI, the manner of monitoring the downlink channel at the one or more POs, including:

determining whether to wake up before the one or more POs based on the received PEI; and in response to determining to wake up before the one or more POs, determining, based on the PEI, the manner of monitoring the downlink channel at the one or more POs.

In an embodiment, the PEI sent by the base station may be configured to indicate third indication information and/or fourth indication information. The third indication information is configured to indicate the terminal to determine whether to wake up before the one or more POs. The fourth indication information is configured to indicate the terminal to determine the manner of monitoring the downlink channel at the one or more POs.

In an embodiment, the terminal may determine, based on the third indication information, whether to wake up before the one or more POs, and determine, based on the fourth indication information, the manner of monitoring the downlink channel at the one or more POs.

It should be understood that when the third indication information is configured to indicate the terminal to wake up, the PEI may indicate the fourth indication information so that the terminal determines the manner of monitoring the downlink channel based on the fourth indication information, when the third indication information is configured to indicate the terminal not to wake up, the PEI does not indicate the fourth indication information.

For example, the third and fourth indication information may be two identifiers, where the first identifier is configured to indicate the terminal whether to wake up or not, and the second identifier is configured to indicate the terminal the manner of monitoring the downlink channel. The terminal resolves the first identifier first, and then resolves the second identifier if the terminal is determined to wake up.

Alternatively, the third indication information and the fourth indication information may be the same identifier, for example, the same identifier may have at least three values indicating three states respectively: indicating the terminal not to wake up before the PO(s); indicating the terminal to wake up before the PO(s) and monitor the downlink channel in a manner that only the PDCCH is to be monitored; and indicating the terminal to wake up before the PO(s) and monitor the downlink channel in a manner that the PDSCH is included to be monitored. In view of the above, in an embodiment, the terminal may determine, based on the PEI, to perform an operation at the PO(s) in one of the following three ways: the terminal does not wake up before the PO(s), the terminal wakes up before the PO(s) and monitors only the PDCCH, or the terminal wakes up before the PO(s) and monitors the downlink channel including the PDSCH.

For example, if the terminal determines based on the received PEI not to wake up before the PO(s), the terminal may not perform monitoring at the PO(s) and stay asleep. If the terminal determines based on the received PEI to wake up and monitor the PDCCH only, the terminal may first determine the synchronization accuracy required to receive the PDCCH, then wake up before the PO(s) to monitor a number of SSB(s) corresponding to the synchronization accuracy, and receive the PDCCH at the PO(s) after completing synchronization. If the terminal determines based on the received PEI to wake up before the PO(s) and monitor at least the PDSCH, the terminal may first determine the synchronization accuracy required to receive the PDSCH, then wake up before the PO(s) to monitor a number of SSBs corresponding to the synchronization accuracy, and receive the PDCCH at the PO(s) after completing synchronization and receive the PDSCH based on the indication of DCI in the PDCCH.

In a second way: the base station sends the PEI only when the terminal needs to wake up. That is, the base station indicates whether the terminal needs to wake up based on whether the PEI is sent or not, and does not necessarily send the PEI at every PEI sending timing. If the terminal does not need to wake up at a PO, the base station will not send a PEI corresponding to the PO. If the terminal needs to wake up at a PO, the base station will send a PEI corresponding to the PO.

The terminal determines, based on the PEI, the manner of monitoring the downlink channel at the one or more POs, including: determining, in response to the PEI being received, to wake up before the one or more POs; and determining, based on the PEI, the manner of monitoring the downlink channel at the one or more POs.

In an embodiment, the PEI sent by the base station is configured to indicate first indication information and second indication information. The first indication information is configured to indicate the terminal to wake up before the one or more POs. The second indication information is configured to indicate the terminal to determine the manner of monitoring the downlink channel at the one or more POs.

It should be noted that since the base station sends the PEI only when the terminal needs to wake up, the base station may not carry other identifiers in the PEI as the first indication information, but the action of "sending the PEI" serves as the first indication information to indicate the terminal to wake up before the PO(s) after the PEI is received by the terminal. Of course, the base station may also carry a specified identifier in the PEI as the first indication information to indicate the terminal to wake up before the PO(s) according to the specified identifier.

In an embodiment, the base station can indicate whether the terminal needs to wake up by whether the PEI is sent or not. On this basis, the second indication information can indicate two states, for example, the second indication information can indicate two states by at least two values of an identifier, which are: indicating the terminal to wake up before the PO(s) and monitor the downlink channel in a manner that only the PDCCH is to be monitored; and indicating the terminal to wake up before the PO(s) and monitor the downlink channel in a manner that the PDSCH is included to be monitored.

In view of the above, in an embodiment, the terminal may determine, based on the PEI, to perform an operation at the PO(s) in one of the following two ways: the terminal wakes up before the PO(s) and monitors only the PDCCH, or the terminal wakes up before the PO(s) and monitors the downlink channel including the PDSCH.

For example, if no PEI is received by the terminal at the PEI receiving timing corresponding to the PO, the terminal determines not to perform monitoring at the PO and stays asleep. If the terminal determines based on the received PEI to wake up before the PO and that the manner of monitoring the downlink channel is to monitor the PDCCH only, the terminal may first determine the synchronization accuracy required to receive the PDCCH, then wake up before the PO to monitor a number of SSBs corresponding to the synchronization accuracy, and receive the PDCCH at the PO after completing the synchronization. If the terminal determines based on the received PEI to wake up before the PO and that the manner of monitoring the downlink channel is to monitor the downlink channel including the PDSCH, the terminal may first determine the synchronization accuracy required to receive the PDSCH, then wake up before the PO to monitor a number of SSBs corresponding to the synchronization accuracy, and receive the PDCCH at the PO after completing the synchronization, and receive the PDSCH based on the indication of the DCI in the PDCCH.

The introduction of the above two ways for the based station to send the PEI is thus completed.

In an embodiment, the base station may use a grouping approach to indicate the manner of monitoring the downlink channel to different terminals through the PEI. For example, the PEI may include a number of information fields associated with a number of terminals respectively, and each terminal may determine the manner of monitoring the downlink channel based on the indication information of the corresponding information field.

In an embodiment, the PEI includes an information field associated with the terminal for indicating the terminal to determine the manner of monitoring the downlink channel at the PO based on a value of the information field. Based on this, in an embodiment, the terminal determines, based on the PEI, the manner of monitoring the downlink channel at the one or more POs, including: determining an information field associated with the terminal in the PEI; and determining, based on a value of the information field, the manner of monitoring the downlink channel at the one or more POs.

In an embodiment, the information field may be a number of bits. Taking one bit as an example, a bit of 0 can indicate the terminal to monitor only PDCCH at the PO, and a bit of 1 can indicate the terminal to monitor the downlink channel including the PDSCH at the PO (i.e., monitoring both PDCCH and PDSCH). Of course, the information field can also include more than one bit, for example, "00" can indicate that the terminal does not need to wake up, etc., which is not repeated here.

In an embodiment, association relationships between the terminals and the information fields in the PEI can be established in advance. For example, the base station groups the terminals within its coverage area. Taking two information fields A and B as an example, the terminals can be divided into group a and group b, where the terminal(s) in group a is associated with information field A and the terminal(s) in group b is associated with information field B. Further, the association relationships can be sent to the terminal.

The base station can carry indication information for broadcast through information field A in the PEI.

After the indication information is received by terminal X in group a, it is determined that the indication information is in information field A, and based on the association relationship, it can be determined that terminal X is associated with information field A. Further, it can be determined that the indication information is directed to terminal X, and then the manner of monitoring the downlink channel at the PO can be determined based on the indication information in information field A.

After the indication information is received by terminal Y in group b, it is determined that the indication information is in information field A, and based on the association relationship, it can be determined that terminal Y is not associated with information field A. Further, it can be determined that the indication information is not directed to terminal Y, so it is not necessary to determine the manner of monitoring the downlink channel at the PO based on the indication information in information field A.

According to the above embodiments, the base station can realize separate indications for different terminals, improving the information transmission efficiency and saving the energy consumption of the base station.

In an embodiment, the PEI sent by the base station can be carried in a variety of ways. In an embodiment, the base station sends the paging early indication (PEI) corresponding to the Paging Occasion (PO) to the terminal, including: sending a sequence carrying the PEI to the terminal, or, sending a DCI carrying the PEI to the terminal.

Based on this, the terminal receives the paging early indication (PET) sent by the base station, including: receiving the sequence carrying the PEI sent by the base station; or, receiving the DCI carrying the PEI sent by the base station.

In an embodiment, the base station may define a new sequence in the PDCCH to carry the PEI and the sequence is not a DCI. Based on this, different root sequences, different time/frequency domain positions of the sequence, different cyclic shifts, etc., may be configured to indicate different states. For example, the time/frequency domain position 1 of the sequence may indicate that the downlink channel includes the PDCCH only; the time/frequency position 2 of the sequence may indicate that the downlink channel includes the PDSCH.

In an embodiment, the base station may carry the PEI via a DCI. For example, the DCI may be a paging DCI for paging a terminal and carry the PEI via a reserve bit of the paging DCI. The DCI may be other DCIs, etc., which are not limited in this embodiment.

Based on the different carrying and indication methods, the terminal can receive and resolve the PEI correspondingly, determine whether it needs to wake up, and determine the manner of monitoring the downlink channel.

Of course, the above embodiments are only exemplary, and in practical applications the base station can use other methods to implement the indication of different manners of monitoring the downlink channel via PEI. As long as the base station and the terminal determine the indication method in advance, the base station can send the PEI according to the indication method and the terminal can resolve the PEI according to the corresponding method, which is not limited in this embodiment.

FIG. 5 is a schematic flowchart of a paging early indication method in accordance with embodiments of the present disclosure. The paging early indication method shown in this embodiment may be applicable to a base station. The base station includes, but is not limited to, a 4G base station, a 5G base station, and a 6G base station. The base station may communicate with a terminal as a user device. The terminal includes, but is not limited to a cell phone, a tablet, a wearable device, a sensor, an IoT device, and other electronic devices. In an embodiment, the terminal may be a terminal to which the paging early indication method described in any of the above embodiments applies.

As shown in FIG. 5, the paging early indication method may include the following steps.

Step S501, sending a Paging Early Indication (PEI) corresponding to one or more Paging Occasions (POs) to a terminal.

The PEI is configured to indicate to the terminal a manner of monitoring a downlink channel at the one or more POs.

In an embodiment, the base station sends the Paging Early Indication (PEI) corresponding to the one or more Paging Occasions (POs) to the terminal before the one or more POs.

In an embodiment, the terminal may receive the PEI sent by the base station and determine the one or more POs corresponding to the PEI.

In an embodiment, the manner of monitoring the downlink channel includes: monitoring only a PDCCH, or monitoring the downlink channel including a PDSCH.

In an embodiment, the base station may indicate via the PEI that the downlink channel includes only the PDCCH, and the terminal may determine based on the PEI to monitor only the PDCCH at the PO and not to monitor the PDSCH.

In an embodiment, the base station may indicate via the PEI that the downlink channel includes the PDSCH, and the terminal may determine based on the PEI to monitor the PDCCH at the PO and also to monitor the PDSCH according to the specific indication of the DCI in the PDCCH.

The introduction of the embodiment shown in FIG. 5 is thus completed. According to the embodiment shown in FIG. 5, the information contained in the PEI is expanded, and compared with the PEI in the related art which only indicates whether the terminal needs to monitor the paging DCI at the corresponding PO, the PEI in this embodiment can also indicate the manner in which the terminal monitors the downlink channel at the corresponding PO, which expands the indication function of the PEI and improves the efficiency of using the PEI, so that the terminal can realize more functions, such as synchronization according to the manner of monitoring the downlink channel, or preparing the hardware and software in advance according to the manner of monitoring the downlink channel, etc.

In an embodiment, there are various ways for the base station to send the PEI, and various ways for the terminal to receive and resolve the PEI correspondingly. Two common implementations will be introduced below.

In a first way: the base station sends the PEI at each PEI sending timing. That is, the base station may send the PEI corresponding to each PO, regardless of whether the terminal needs to wake up at that PO to monitor the downlink channel. The PEI is configured to indicate the terminal to determine, based on the received PEI, whether to wake up before the one or more POs and, to determine, based on the PEI, the manner of monitoring the downlink channel at the one or more POs if it is determined to wake up before the one or more POs.

In an embodiment, the PEI is configured to indicate third indication information and/or fourth indication information.

The third indication information is configured to indicate the terminal to determine whether to wake up before the one or more POs. The fourth indication information is configured to indicate the terminal to determine the manner of monitoring the downlink channel at the one or more POs. In an embodiment, the PEI sent by the base station may indicate three states respectively: indicating the terminal not to wake up before the PO(s); indicating the terminal to wake up before the PO(s) and monitor the downlink channel in a manner that only the PDCCH is to be monitored; and indicating the terminal to wake up before the PO(s) and monitor the downlink channel in a manner that the PDSCH is included to be monitored.

Based on this, in an embodiment, the terminal may determine, based on the PEI, to perform an operation at the PO(s) in one of the following three ways: the terminal does not wake up before the PO(s), the terminal wakes up before the PO(s) and monitors only the PDCCH, or the terminal wakes up before the PO(s) and monitors the downlink channel including the PDSCH.

In a second way: the base station sends the PEI only when the terminal needs to wake up. That is, the base station indicates whether the terminal needs to wake up based on whether the PEI is sent or not, and does not necessarily send the PEI at every PEI sending timing. If the terminal does not need to wake up at a PO, the base station will not send a PEI corresponding to the PO. If the terminal needs to wake up at a PO, the base station will send a PEI corresponding to the PO. The PEI is configured to indicate the terminal to wake up before the PO(s) in response to the PEI being received and to determine based on the PEI the manner of monitoring the downlink channel at the one or more POs.

In an embodiment, the PEI sent by the base station is configured to indicate first indication information and second indication information.

The first indication information is configured to indicate the terminal to wake up before the one or more POs. The second indication information is configured to indicate the terminal to determine the manner of monitoring the downlink channel at the one or more POs.

In an embodiment, the base station can indicate whether the terminal needs to wake up by whether the PEI is sent or not. On this basis, the base station can also use other identifier as the second indication information, and at least two values of the identifier indicate two states respectively, which are: indicating the terminal to wake up before the PO(s) and monitor the downlink channel in a manner that only the PDCCH is to be monitored; and indicating the terminal to wake up before the PO(s) and monitor the downlink channel in a manner that the PDSCH is included to be monitored.

In view of the above, in an embodiment, the terminal may determine, based on the PEI, to perform an operation at the PO(s) in one of the following two ways: the terminal wakes up before the PO(s) and monitors only the PDCCH, or the terminal wakes up before the PO(s) and monitors the downlink channel including the PDSCH.

The introduction of the above two ways for the based station to send the PEI is thus completed.

In an embodiment, the base station may use a grouping approach to indicate the manner of monitoring the downlink channel to different terminals through the PEI. In an embodiment, the PEI includes an information field associated with the terminal for indicating the terminal to determine the manner of monitoring the downlink channel based on a value of the information field.

According to the above embodiments, the base station can realize separate indications for different terminals, improving the information transmission efficiency and saving the energy consumption of the base station.

In an embodiment, the PEI sent by the base station can be carried in a variety of ways. In an embodiment, the sending the Paging Early Indication (PEI) corresponding to the one or more Paging Occasions (POs) to the terminal, includes: sending a sequence carrying the PEI to the terminal; or, sending a DCI carrying the PEI to the terminal.

Based on this, the terminal may obtain and resolve the PEI in the sequence, or, alternatively, the terminal may obtain and resolve the PEI in the DCI. Thus, the terminal can determine the manner of monitoring the downlink channel at the PO(s).

Corresponding to the aforementioned embodiments of the paging early indication methods, the present disclosure also provides embodiments of paging early indication apparatuses.

Figure 6:
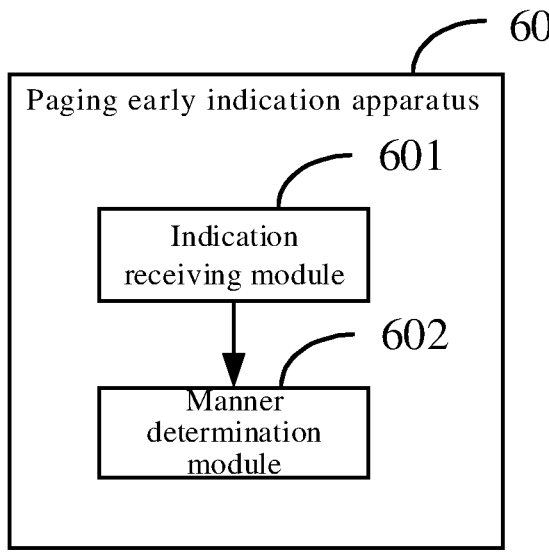
FIG. 6 is a schematic block diagram of a paging early indication apparatus in accordance with embodiments of the present disclosure.

FIG. 6 is a schematic flowchart of a paging early indication apparatus in accordance with embodiments of the present disclosure. The paging early indication apparatus shown in this embodiment may be applicable to a terminal. The terminal includes, but is not limited to, a cell phone, a tablet, a wearable device, a sensor, an IoT device, and other electronic devices. The terminal can communicate with a base station as a user device. The base station includes, but is not limited to, a 4G base station, a 5G base station, a 6G base station. In an embodiment, the base station can be a base station to which the paging early indication apparatus described in any of the following embodiments applies.

As shown in FIG. 6, the paging early indication apparatus 60 may include:

an indication receiving module 601 configured to receive a Paging Early Indication (PEI) from a base station, wherein the PEI corresponds to one or more Paging Occasions (POs); and a manner determination module 602 configured to determine, based on the PEI, a manner of monitoring a downlink channel at the one or more POs.

In an embodiment, the manner of monitoring the downlink channel includes: monitoring only a PDCCH, or monitoring the downlink channel including a PDSCH.

Figure 7:
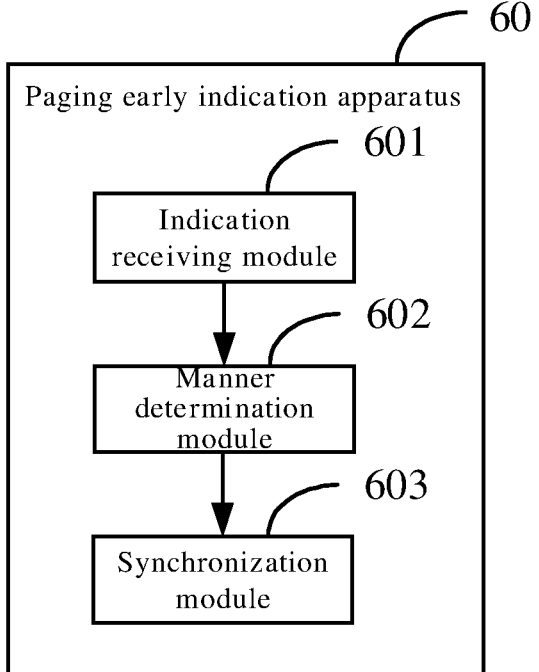
FIG. 7 is a schematic block diagram of another paging early indication apparatus in accordance with embodiments of the present disclosure.

FIG. 7 is a schematic block diagram of another paging early indication apparatus in accordance with embodiments of the present disclosure. As shown in FIG. 7, the apparatus 60 may further include:

a synchronization module 603 configured to perform synchronization with the base station for the downlink channel monitored at the one or more POs based on the manner of monitoring the downlink channel.

In an embodiment, the synchronization module 603 is specifically configured to:

determine a synchronization accuracy required to receive the downlink channel based on the manner of monitoring the downlink channel; and perform synchronization, according to the synchronization accuracy, for the downlink channel monitored at the one or more POs.

In an embodiment, the synchronization module 603, when configured to perform synchronization, according to the synchronization accuracy, for the downlink channel monitored at the one or more POs, is specifically configured to:

determine a number of synchronization sequence blocks required for the synchronization accuracy;

monitor at least the number of synchronization sequence blocks before each PO of the one or more POs; and perform synchronization for the downlink channel monitored at each PO based on the monitored synchronization sequence blocks.

In an embodiment, the synchronization module 603, when configured to determine the synchronization accuracy required to receive the downlink channel based on the manner of monitoring the downlink channel, is specifically configured to:

determine that the manner of monitoring the downlink channel is to monitor only the PDCCH, determine the synchronization accuracy as a first accuracy;

determine that the manner of monitoring the downlink channel is to monitor the downlink channel including the PDSCH, determine the synchronization accuracy as a second accuracy;

wherein the first accuracy is lower than the second accuracy.

In an embodiment, the manner determination module 602 is specifically configured to:

receive the PEI, and determine to wake up before the one or more POs; and determine, based on the PEI, the manner of monitoring the downlink channel at the one or more POs.

Alternatively, the manner determination module 602 is specifically configured to:

determine whether to wake up before the one or more POs based on the received PEI; and determine to wake up before the one or more POs, determine, based on the PEI, the manner of monitoring the downlink channel at the one or more POs.

In an embodiment, the manner determination module 602 is specifically configured to:

determine an information field associated with the terminal in the PEI; and determine, based on a value of the information field, the manner of monitoring the downlink channel at the one or more POs.

In an embodiment, the indication receiving module 601 is specifically configured to:

receive a sequence carrying the PEI from the base station; or receive a DCI carrying the PEI from the base station.

Figure 8:
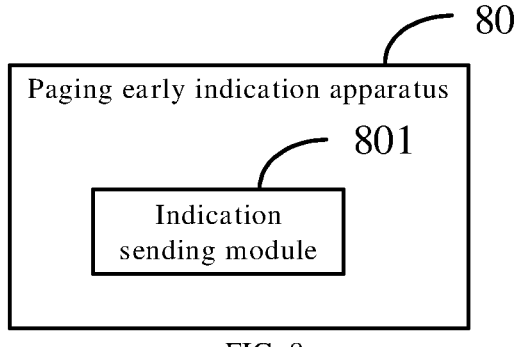
FIG. 8 is a schematic block diagram of yet another paging early indication apparatus in accordance with embodiments of the present disclosure.

FIG. 8 is a schematic block diagram of a paging early indication apparatus in accordance with embodiments of the present disclosure. The paging early indication apparatus shown in this embodiment may be applicable to a base station. The base station includes, but is not limited to, a 4G base station, a 5G base station, and a 6G base station. The base station may communicate with a terminal as a user device. The terminal includes, but is not limited to a cell phone, a tablet, a wearable device, a sensor, an IoT device, and other electronic devices. In an embodiment, the terminal may be a terminal to which the paging early indication apparatus described in any of the above embodiments applies.

As shown in FIG. 8, the apparatus 80 includes:

an indication sending module 801 configured to send a Paging Early Indication (PEI) corresponding to one or more Paging Occasions (POs) to a terminal; wherein the PEI is configured to indicate to the terminal a manner of monitoring a downlink channel at the one or more POs.

In an embodiment, the manner of monitoring the downlink channel includes: monitoring only a PDCCH, or monitoring the downlink channel including a PDSCH.

In an embodiment, the PEI is configured to indicate first indication information and second indication information, wherein the first indication information is configured to indicate the terminal to wake up before the one or more POs; and the second indication information is configured to indicate the terminal to determine the manner of monitoring the downlink channel at the one or more POs.

In an embodiment, the PEI is configured to indicate third indication information and/or fourth indication information; wherein the third indication information is configured to indicate the terminal to determine whether to wake up before the one or more POs; and the fourth indication information is configured to indicate the terminal to determine the manner of monitoring the downlink channel at the one or more POs.

In an embodiment, the PEI includes an information field associated with the terminal, and the information field is configured to indicate the terminal to determine the manner of monitoring the downlink channel at the one or more POs based on a value of the information field.

In an embodiment, the indication sending module 801 is specifically configured to:

send a sequence carrying the PEI to the terminal; or send a DCI carrying the PEI to the terminal.

Regarding the apparatuses in the above embodiments, the specific way in which each module performs its operation has been described in detail in the embodiments of the relevant method, and will not be described in detail here.

For the apparatus embodiments, since they correspond substantially to the method embodiments, it is sufficient to refer, where relevant, to the partial description of the method embodiments. The apparatus embodiments described above are merely schematic, where the modules described as separate components may or may not be physically separated, and the components shown as modules may or may not be physical modules, i.e., they may be located in one place or may be distributed to multiple network modules. Some or all of these modules may be selected according to practical needs to achieve the purpose of the solution of the embodiments. It can be understood and implemented by a person of ordinary skill in the art without creative effort.

A specific embodiment of a paging early indication method is described below. It may be performed by a terminal and includes the following steps:

receiving a Paging Early Indication (PEI) from a base station, wherein the PEI corresponds to one or more Paging Occasions (POs); and determining, based on the PEI, a manner of monitoring a downlink channel at the one or more POs.

In an embodiment, the manner of monitoring the downlink channel includes: monitoring only a PDCCH; or monitoring the downlink channel including a PDSCH.

In an embodiment, the method further includes: performing synchronization with the base station for the downlink channel monitored at the one or more POs based on the manner of monitoring the downlink channel.

In an embodiment, the performing synchronization with the base station for the downlink channel monitored at the one or more POs based on the manner of monitoring the downlink channel, includes:

determining a synchronization accuracy required to receive the downlink channel based on the manner of monitoring the downlink channel; and performing synchronization, according to the synchronization accuracy, for the downlink channel monitored at the one or more POs.

In an embodiment, the performing synchronization, according to the synchronization accuracy, for the downlink channel monitored at the one or more POs, includes:

determining a number of synchronization sequence blocks required for the synchronization accuracy; monitoring at least the number of synchronization sequence blocks before each PO of the one or more POs; and performing synchronization for the downlink channel monitored at each PO based on the monitored synchronization sequence blocks.

In an embodiment, the determining the synchronization accuracy required to receive the downlink channel based on the manner of monitoring the downlink channel, includes.

determining that the manner of monitoring the downlink channel is to monitor only the PDCCH, determining the synchronization accuracy as a first accuracy; determining that the manner of monitoring the downlink channel is to monitor the downlink channel including the PDSCH, determining the synchronization accuracy as a second accuracy: wherein the first accuracy is lower than the second accuracy.

In an embodiment, the determining, based on the PEI, the manner of monitoring the downlink channel at the one or more POs, includes:

receiving the PEI, determine to wake up before the one or more POs; and determining, based on the PEI, the manner of monitoring the downlink channel at the one or more POs.

In an embodiment, the determining, based on the PEI, the manner of monitoring the downlink channel at the one or more POs, includes: determining whether to wake up before the one or more POs based on the received PEI; and determining to wake up before the one or more POs, determining, based on the PEI, the manner of monitoring the downlink channel at the one or more POs.

In an embodiment, the determining, based on the PEI, the manner of monitoring the downlink channel at the one or more POs, includes:

determining an information field associated with the terminal in the PEI; and determining, based on a value of the information field, the manner of monitoring the downlink channel at the one or more POs.

In an embodiment, the receiving the PEI from the base station includes:

receiving a sequence carrying the PEI from the base station; or receiving a DCI carrying the PEI from the base station.

A specific embodiment of a paging early indication method is described below. It may be applied to a base station and includes the following steps:

sending a Paging Early Indication (PEI) corresponding to one or more Paging Occasions (POs) to a terminal; wherein the PEI is configured to indicate to the terminal a manner of monitoring a downlink channel at the one or more POs.

In an embodiment, the manner of monitoring the downlink channel includes: monitoring only a PDCCH; or monitoring the downlink channel including a PDSCH.

In an embodiment, the PEI is configured to indicate first indication information and second indication information; wherein the first indication information is configured to indicate the terminal to wake up before the one or more POs; and the second indication information is configured to indicate the terminal to determine the manner of monitoring the downlink channel at the one or more POs.

In an embodiment, the PEI is configured to indicate third indication information and/or fourth indication information: wherein the third indication information is configured to indicate the terminal to determine whether to wake up before the one or more POs; and the fourth indication information is configured to indicate the terminal to determine the manner of monitoring the downlink channel at the one or more POs.

In an embodiment, the PEI includes an information field associated with the terminal, and the information field is configured to indicate the terminal to determine the manner of monitoring the downlink channel at the one or more POs based on a value of the information field.

In an embodiment, the sending the PEI corresponding to the one or more POs to the terminal, includes: sending a sequence carrying the PEI to the terminal; or sending a DCI carrying the PEI to the terminal.

A specific paging early indication mechanism according to the present disclosure is described below in general exemplary terms in conjunction with specific technical details, as follows.

When the terminal is in a RRC-IDLE state or RRC-INACTIVE state, the main behavior of the UE is to monitor a paging message periodically and to enter a RRC-CONNECTED state for normal communication after receiving the paging message. The paging message is carried in the PDSCH and need to be scheduled by the DCI that is scrambled by P-RNTI (also known as paging DCI). For a UE, its corresponding paging occasion (i.e., PO, timing for transmitting Paging DCI) occurs periodically, and multiple UEs may use the same set of periodic PO resources, i.e., there may be multiple UEs' paging messages at a single PO.

The operation of the UE for monitoring the paging message is as follows: the UE monitors whether there is a DCI scrambled by P-RNTI at its corresponding PO, and if the DCI scrambled by P-RNTI is monitored at the PO and the DCI schedules a PDSCH containing a paging message, the UE will further receive and demodulate the PDSCH according to the instructions of the DCI. If no DCI scrambled by P-RNTI is monitored, or if there is such a DCI but the DCI does not schedule a PDSCH containing a paging message, the terminal does not have to receive and demodulate the PDSCH. Of course, regardless of whether the PDSCH with the paging message is scheduled or not, the paging DCI can further carry a short message which is carried directly in the paging DCI and does not need to be carried by scheduling the PDSCH. The content carried in the short message includes system information update reminder, emergency disaster avoidance information, etc.

In the related art, the UE needs to wake up at each paging cycle for synchronization and blindly check whether there is its own paging DCI at its own corresponding PO. In R17, in order to save terminal energy in idle state, the base station can send a paging early indication (PEI) to the terminal before the PO corresponding to the terminal. If the PEI indicates that the terminal needs to monitor paging messages at its own PO, the UE will perform monitoring. If the PEI indicates that the terminal does not need to monitor the paging at its own PO, the UE will not perform monitoring.

The terminal requires different synchronization accuracy for receiving the PDCCH and receiving the PDSCH. For example, the synchronization accuracy required for receiving the PDCCH is 0.5 ppm, while the synchronization accuracy required for receiving the PDSCH is 0.1 ppm, which means that if the terminal only needs to receive the PDCCH (i.e., only receives the DCI), the number of synchronization sequence blocks (SSBs) required for synchronization is less than the number of SSBs for synchronization required for receiving the PDSCH. For example, if the terminal only needs to receive the PDCCH, it needs to use one SSB for synchronization before receiving the PDCCH to achieve the required synchronization accuracy. While, it needs to use 3 consecutive SSBs in the time domain for synchronization before receiving the PDSCH to achieve the required synchronization accuracy. This also means that when the terminal is in the RRC-IDLE state, the energy consumption required to receive only the PDCCH is lower than that required to receive the PDSCH.

The present disclosure proposes a method for energy saving indication. In the method, the paging early indication (PEI) sent by the base station for the terminal distinguishes between the terminal receiving only paging DCI or receiving paging PDSCH as well.

The paging early indication (PEI) sent by the base station for the terminal will distinguish whether only paging DCI needs to be received or paging PDSCH is further required to be received.

The advantage of distinguishing between receiving only paging DCI or receiving PDSCH as well via the PEI is that if only paging DCI is received, only a small number of SSBs (e.g., 1 SSB) need to be monitored in order to achieve the synchronization accuracy required for monitoring DCI. If the PDSCH needs to be monitored, more SSBs (e.g. 3 SSBs) are required to achieve the synchronization accuracy for monitoring the PDSCH. Therefore, if the PEI indicates whether to receive only the paging DCI or also to receive the PDSCH, the UE can determine the number of SSBs to be monitored accordingly, thus saving energy.

If a PEI needs to be sent at each PEI sending timing, the following three states need to be indicated in the PEI: no-wake up/only receive paging DCI/receive paging PDSCH.

If sending or not of a PEI is configured to indicate whether the UE needs to wake up or not, the PEI needs to indicate 2 states: only receive paging DCI/receive paging PDSCH.

In addition, PDSCH reception can be in the form of groups. For example, there are 4 groups, with 4 bits indicating whether the UE(s) in the respective group has the corresponding paging PDSCH to receive, and with all "0" indicating that only paging DCI has to be received.

The PEI information can be carried either by sequence or by DCI.

Here, when using sequences, different states can be represented by different root sequences, different time/frequency domain positions of sequences, different cyclic shifts, etc. When using DCI, the PEI is carried in a reserve bit of the paging DCI, or other DCI different from the paging DCI is configured to carry the PEI information. The information fields in DCI are configured to represent different states.

Embodiments of the present disclosure also propose an electronic device including:

a processor; and a memory for storing instructions executable by the processor, wherein the processor is configured to implement the paging early indication method described in any of the above embodiments.

Embodiments of the present disclosure also propose a computer readable storage medium having a computer program stored thereon, wherein the program, when executed by a processor, causes the processor to implement the steps in the paging early indication method described in any of the above embodiments.

Figure 9:
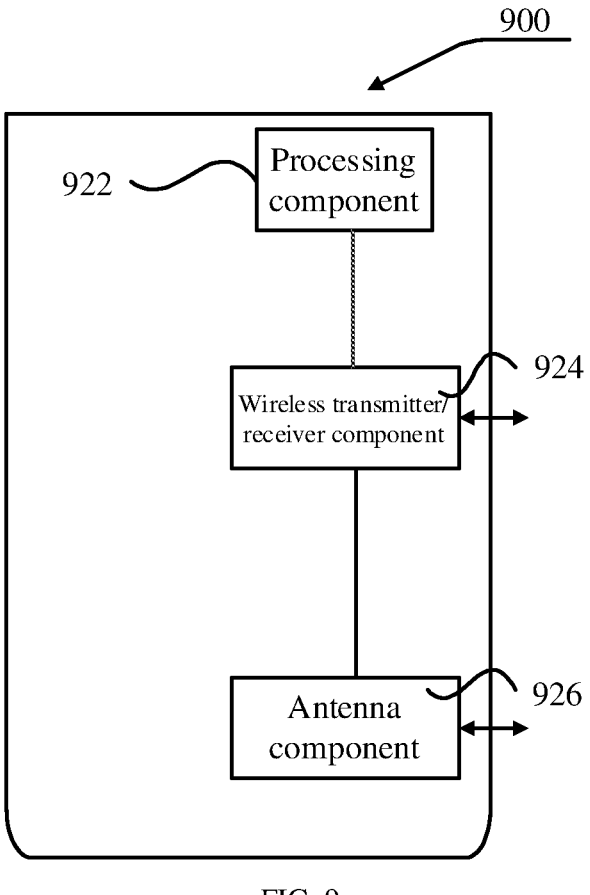
FIG. 9 is a schematic block diagram of a device for paging early indication in accordance with embodiments of the present disclosure.

As shown in FIG. 9, FIG. 9 is a schematic block diagram of a device 900 for paging early indication in accordance with embodiments of the present disclosure. The device 900 may be provided as a base station. Referring to FIG. 9, the device 900 includes a processing component 922, a wireless transmitter/receiver component 924, an antenna component 926, and a signal processing portion specific to the wireless interface. The processing component 922 may further include one or more processors. One of the processors in the processing component 922 may be configured to implement a paging early indication.

Figure 10:
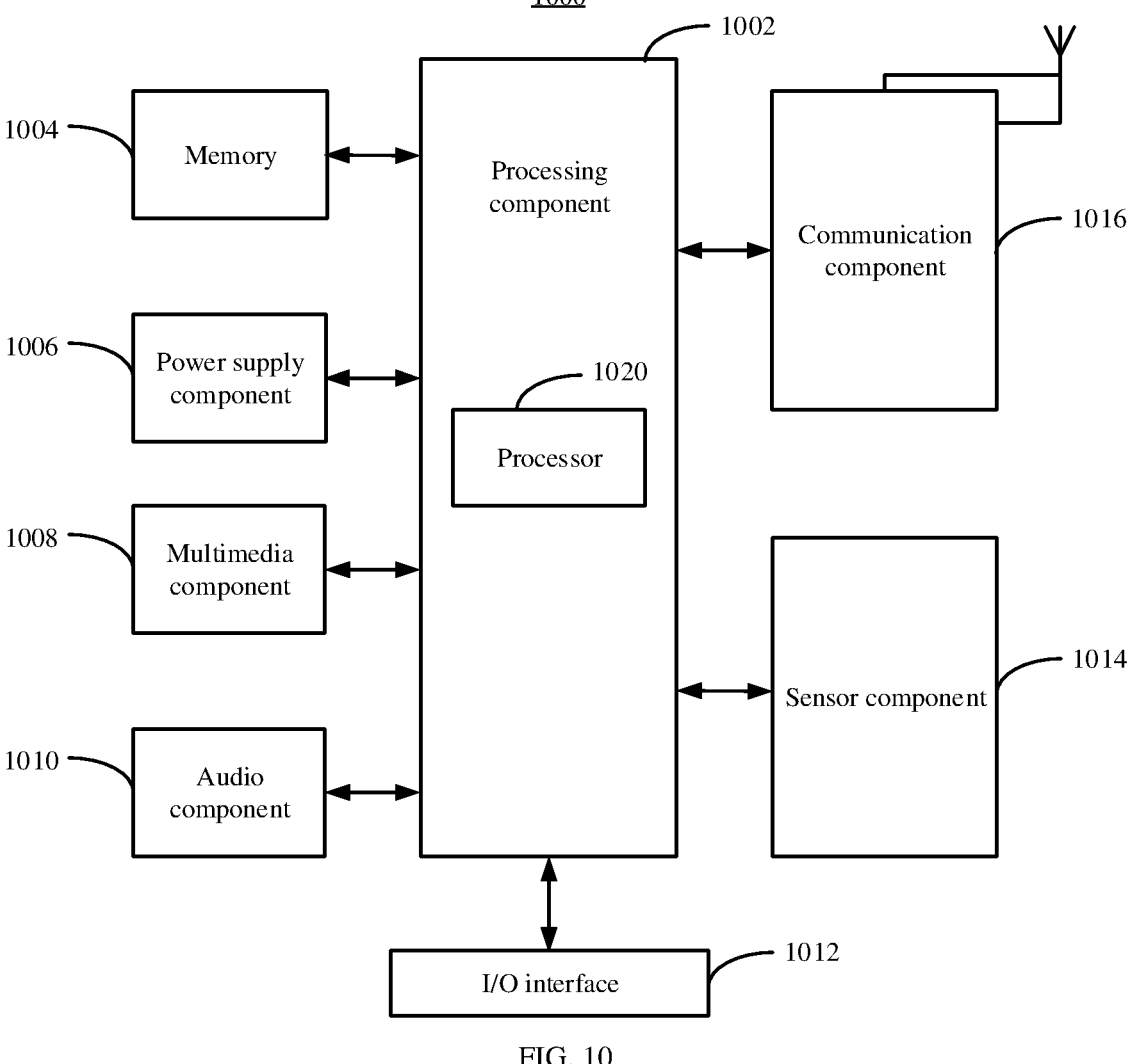
FIG. 10 is a schematic block diagram of a device for paging early indication in accordance with embodiments of the present disclosure.

FIG. 10 is a schematic block diagram of a device 1000 for paging early indication in accordance with embodiments of the present disclosure. For example, the device 1000 may be a cell phone, a computer, a digital broadcast terminal, a message sending and receiving device, a game console, a tablet device, a medical device, a fitness device, a personal digital assistant, etc.

Referring to FIG. 10, the device 1000 may include one or more of the following components: processing component 1002, memory 1004, power supply component 1006, multimedia component 1008, audio component 1010, input/output (I/O) interface 1012, sensor component 1014, and communication component 1016.

The processing component 1002 generally controls the overall operation of device 1000, such as operations associated with display, telephone call, data communication, camera operation, and recording operations. The processing component 1002 may include one or more processors 1020 to execute instructions to complete all or some of the steps of the paging early indication method described above. In addition, the processing component 1002 may include one or more modules that facilitate interaction between processing component 1002 and other components. For example, the processing component 1002 may include a multimedia module to facilitate interaction between the multimedia component 1008 and the processing component 1002.

The memory 1004 is configured to store various types of data to support operation at the device 1000. Examples of such data include instructions for any application or method operating on the device 1000, contact data, phonebook data, messages, pictures, videos, etc. The memory 1004 may be implemented by any type of volatile or non-volatile storage device or a combination thereof, such as static random access memory (SRAM), electrically erasable program- mable read-only memory (EEPROM), erasable program- mable read-only memory (EPROM), programmable read- only memory (PROM), read-only memory (ROM), magnetic memory, flash memory, Disk or CD-ROM.

The power supply component 1006 provides power to various components of the device 1000. The power supply component 1006 may include a power management system, one or more power supplies, and other components associ- ated with generating, managing, and distributing power for the device 1000.

The device 1000 includes a screen that provides an output interface between the device 1000 and the user. In some embodiments, the screen may include a liquid crystal dis- play (LCD) and a touch panel (TP). If the screen includes a touch panel, the screen may be implemented as a touch screen to receive input signals from the user. The touch panel includes one or more touch sensors to sense touches, swipes, and gestures on the touch panel. The touch sensors may not only sense the boundaries of the touch or swipe action, but also detect the duration and pressure associated with the touch or swipe action. In some embodiments, the multime- dia component 1008 includes a front-facing camera and/or a rear-facing camera. The front-facing camera and/or rear- facing camera can receive external multimedia data when the device 1000 is in an operating mode, such as shooting mode or video mode. Each front-facing camera and rear- facing camera may be a fixed optical lens system or have focal length and optical zoom capability.

The audio component 1010 is configured to output and/or input audio signals. For example, the audio component 1010 includes a microphone (MIC) configured to receive external audio signals when the device 1000 is in an operating mode, such as call mode, record mode, and voice recognition mode. The received audio signal may be further stored in memory 1004 or sent via communication component 1016. In some embodiments, the audio component 1010 further includes a speaker for outputting the audio signal.

The I/O interface 1012 provides an interface between the processing component 1002 and the peripheral interface modules, and the peripheral interface modules may be keypads, click wheels, buttons, etc. These buttons may include, but are not limited to: home button, volume button, start button, and lock button.

The sensor component 1014 includes one or more sensors for providing status assessment of various aspects of the device 1000. For example, the sensor component 1014 may detect an open/closed state of the device 1000, the relative positioning of components, such as the components being the display and keypad of the device 1000, and the sensor component 1014 may also detect a change in position of the device 1000 or a component of the device 1000, the presence or absence of user contact with the device 1000, the orien- tation of the device 1000 or acceleration/deceleration, and temperature changes of the device 1000. The sensor com- ponent 1014 may include a proximity sensor configured to detect the presence of nearby objects in the absence of any physical contact. The sensor component 1014 may also include a light sensor, such as a CMOS or CCD image sensor, for use in imaging applications. In some embodi- ments, the sensor component 1014 may also include an accelerometer sensor, a gyroscope sensor, a magnetic sensor, a pressure sensor, or a temperature sensor.

The communication component 1016 is configured to facilitate communication between the device 1000 and other devices by wired or wireless means. The device 1000 may access a wireless network based on a communication stan- dard such as WiFi, 2G or 3G, 4G LTE, 5G NR, or a combination thereof. In one exemplary embodiment, the communication component 1016 receives broadcast signals or broadcast-related information from an external broadcast management system via a broadcast channel. In an exem- plary embodiment, the communication component 1016 further includes a near-field communication (NFC) module to facilitate short-range communication. For example, the NFC module may be implemented based on radio frequency identification (RFID) technology, infrared data association (IrDA) technology, ultra-wideband (UWB) technology, Blu- etooth (BT) technology, and other technologies.

In exemplary embodiments, the device 1000 may be implemented by one or more application-specific integrated circuits (ASICs), digital signal processors (DSPs), digital signal processing devices (DSPDs), programmable logic devices (PLDs), field-programmable gate arrays (FPGAs), controllers, microcontrollers, microprocessors, or other electronic components for performing the above paging early indication method.

In exemplary embodiments, there is also provided a non-transitory computer readable storage medium including instructions, such as a memory 1004 including instructions, the instructions being executable by the processor 1020 of the device 1000 to accomplish the paging early indication method described above. For example, the non-transitory computer readable storage medium may be ROM, random access memory (RAM), CD-ROM, magnetic tape, floppy disk, and optical data storage device, among others.

Other embodiments of the present disclosure will readily come to the mind of those skilled in the art upon consider- ation of the specification and practice of the application disclosed herein. The present disclosure is intended to cover any variation, use, or adaptation of this disclosure that follows the general principles of this disclosure and includes commonly known or customary technical means in the art that are not disclosed herein. The specification and embodi- ments are to be considered exemplary only, and the true scope and spirit of the present disclosure is indicated by the following claims.

It should be understood that the present disclosure is not limited to the precise construction already described above and illustrated in the accompanying drawings, and that various modifications and changes may be made without departing from its scope. The scope of the present disclosure is limited only by the appended claims.

It should be noted that in this document, relationship terms such as "first" and "second" are used only to distin- guish one entity or operation from another, without neces- sarily requiring or implying any such actual relationship or order between those entities or operations. The terms "including/comprising," "containing," or any other variation thereof, are intended to cover non-exclusive inclusion so that a process, method, object, or apparatus that includes a set of elements includes not only those elements, but also other elements not explicitly listed, or also includes ele- ments inherent in such a process, method, object, or appa- ratus. Without further limitations, an element defined by the phrase "including/comprising one of . . . " does not preclude the existence of additional identical elements in the process, method, object, or apparatus that includes the element.

The methods and devices provided by the embodiments of the present disclosure are described in detail above, and specific examples are applied in this disclosure to illustrate the principles and implementation of the present disclosure. The above description of the embodiments is only used to help understand the method of the present disclosure and its core ideas. Further, for those of ordinary skill in the art, there will be changes in the specific implementation and the scope of application according to the ideas of the present disclosure. In summary, the content of this specification should not be understood as a limitation of the present disclosure.

What is claimed is:

1. A paging early indication method, performed by a user equipment (UE), the method comprising:
    receiving a Paging Early Indication (PEI) from a network device, wherein the PEI corresponds to one or more Paging Occasions (POs); and
    determining, based on the PEI, a manner of monitoring a downlink channel at the one or more POs;
    wherein the PEI comprises a plurality of information fields, and the determining, based on the PEI, the manner of monitoring the downlink channel at the one or more POs, comprises:
        determining an information field associated with the UE from the plurality of information fields in the PEI; and
        determining, based on a value of the information field, the manner of monitoring the downlink channel at the one or more POs.

2. The method of claim 1, wherein the manner of monitoring the downlink channel comprises one of:
    monitoring only a Physical Downlink Control Channel (PDCCH); or
    monitoring the downlink channel including a Physical Downlink Share Channel (PDSCH).

3. The method of claim 2, further comprising:
    performing synchronization with the network device for the downlink channel monitored at the one or more POs based on the manner of monitoring the downlink channel.

4. The method of claim 3, wherein the performing synchronization with the network device for the downlink channel monitored at the one or more POs based on the manner of monitoring the downlink channel, comprises:
    determining a synchronization accuracy required to receive the downlink channel based on the manner of monitoring the downlink channel; and
    performing synchronization, according to the synchronization accuracy, for the downlink channel monitored at the one or more POs.

5. The method of claim 4, wherein the performing synchronization, according to the synchronization accuracy, for the downlink channel monitored at the one or more POs, comprises:
    determining a number of synchronization sequence blocks required for the synchronization accuracy;
    monitoring at least the number of synchronization sequence blocks before each PO of the one or more POs; and
    performing synchronization for the downlink channel monitored at each PO based on the monitored synchronization sequence blocks.

6. The method of claim 4, wherein the determining the synchronization accuracy required to receive the downlink channel based on the manner of monitoring the downlink channel, comprises:
    determining that the manner of monitoring the downlink channel is to monitor only the PDCCH, determining the synchronization accuracy as a first accuracy; and
    determining that the manner of monitoring the downlink channel is to monitor the downlink channel including the PDSCH, determining the synchronization accuracy as a second accuracy;
    wherein the first accuracy is lower than the second accuracy.

7. The method of claim 1, wherein the determining, based on the PEI, the manner of monitoring the downlink channel at the one or more POs, comprises:
    receiving the PEI, determining to wake up before the one or more POs; and
    determining, based on the PEI, the manner of monitoring the downlink channel at the one or more POs.

8. The method of claim 1, wherein the determining, based on the PEI, the manner of monitoring the downlink channel at the one or more POs, comprises:
    determining whether to wake up before the one or more POs based on the received PEI; and
    determining to wake up before the one or more POs, determining, based on the PEI, the manner of monitoring the downlink channel at the one or more POs.

9. The method of claim 1, wherein the receiving the PEI from the network device comprises at least one of:
    receiving a sequence carrying the PEI from the network device; or
    receiving a Downlink Control Information (DCI) carrying the PEI from the network device.

10. A paging early indication method, performed by a network device, the method comprising:
    transmitting a Paging Early Indication (PEI) corresponding to one or more Paging Occasions (POs) to a user equipment (UE);
    wherein the PEI is configured to indicate to the UE a manner of monitoring a downlink channel at the one or more POs; and
    the PEI comprises a plurality of information fields, an information field in the plurality of information fields is associated with a group of UEs, and the information field associated with the group of UEs is configured to indicate the group of UEs to determine the manner of monitoring the downlink channel at the one or more POs based on a value of the information field.

11. The method of claim 10, wherein the manner of monitoring the downlink channel comprises one of:
    monitoring only a Physical Downlink Control Channel (PDCCH); or
    monitoring the downlink channel including a Physical Downlink Share Channel (PDSCH).

12. The method of claim 10, wherein the PEI is configured to indicate first indication information and second indication information; and
    wherein the first indication information is configured to indicate the UE to wake up before the one or more POs; and
    the second indication information is configured to indicate the UE to determine the manner of monitoring the downlink channel at the one or more POs.

13. The method of claim 10, wherein the PEI is configured to indicate at least one of third indication information or fourth indication information; and wherein the third indication information is configured to indicate the UE to determine whether to wake up before the one or more POs; and the fourth indication information is configured to indicate the UE to determine the manner of monitoring the downlink channel at the one or more POs.

14. The method of claim 10, wherein the transmitting the PEI corresponding to the one or more POs to the UE, comprises at least one of:

transmitting a sequence carrying the PEI to the UE; or transmitting a Downlink Control Information (DCI) carrying the PEI to the UE.

15. A user equipment (UE), comprising:

a processor; and a memory for storing instructions executable by the processor;

wherein the processor is configured to:

receive a Paging Early Indication (PEI) from a network device, wherein the PEI corresponds to one or more Paging Occasions (POs); and determine, based on the PEI, a manner of monitoring a downlink channel at the one or more POs;

wherein the PEI comprises a plurality of information fields, and the processor is further configured to:

determine an information field associated with the UE in the PEI from the plurality of information fields in the PEI; and determine, based on a value of the information field, the manner of monitoring the downlink channel at the one or more POs.

16. A non-transitory computer readable storage medium having a computer program stored thereon, wherein the program, when executed by a processor of a user equipment (UE), causes the UE to perform the method of claim 1.

17. A network device, comprising:

a processor; and a memory for storing instructions executable by the processor;

wherein the processor is configured to perform the method of claim 11.

18. A non-transitory computer readable storage medium having a computer program stored thereon, wherein the program, when executed by a processor of a network device, causes the network device to perform the method of claim 10.

19. The method of claim 1, wherein the PEI is transmitted by the network device to the UE, any information field in the plurality of information fields is associated with a group of UEs, and different information fields are associated with different UEs.

20. The method of claim 10, wherein the transmitting the PEI corresponding to one or more POs to the UE comprises:

transmitting the PEI to a plurality of groups of UEs, respectively;

wherein different information fields are associated with different UEs, and for any group of UEs, the PEI comprises an information field associated with the group of UEs.

*     *     *     *     *